United States Patent [19]

Breidenthal

[11] Patent Number: 4,902,102
[45] Date of Patent: Feb. 20, 1990

[54] ASPHERIC OPTICAL TEST PLATE ASSEMBLY

[75] Inventor: Robert S. Breidenthal, Bolton, Mass.

[73] Assignee: Litton Systems, Inc., Lexington, Mass.

[21] Appl. No.: 173,796

[22] Filed: Mar. 28, 1988

[51] Int. Cl.⁴ .................................. G02B 7/00
[52] U.S. Cl. ........................ 350/321; 350/631; 356/359; 248/316.1; 65/39; 51/216 LP
[58] Field of Search .............. 350/417, 418, 607, 608, 350/631, 609, 321; 351/177, 178; 248/315, 316.1, 154, 505; 264/1.2, 40.2, 2.7; 65/37, 38, 39, 42, 357, 361; 51/324, 284, 216 LP, 217 L; 356/359, 360

[56] References Cited

U.S. PATENT DOCUMENTS

| | | | |
|---|---|---|---|
| 60,109 | 11/1866 | Woodward | 350/418 |
| 413,021 | 10/1889 | Buhring | 248/315 |
| 509,379 | 11/1893 | Ingram | 350/418 |
| 2,794,368 | 6/1957 | Kosa | 350/418 |
| 3,511,679 | 5/1970 | Warren | 65/37 |
| 3,514,776 | 5/1970 | Mulready | 350/608 |
| 4,422,723 | 12/1983 | Williams, Jr. et al. | 350/608 |
| 4,457,625 | 7/1984 | Greenleaf et al. | 356/4.5 |
| 4,725,144 | 2/1988 | Nelson et al. | 350/607 |
| 4,734,557 | 3/1988 | Alfille et al. | 350/608 |

Primary Examiner—Rodney B. Bovernick
Assistant Examiner—R. D. Shafer
Attorney, Agent, or Firm—Michael H. Wallach; Robert F. Rotella

[57] ABSTRACT

An aspheric optical test plate assembly is disclosed which permits a qualitative comparison to be made between the surface contour of a known area of an aspheric optical element and the surface contour of an area on the aspheric optical element which should be equivalent to the contour of the known area. The aspheric optical test plate assembly includes an optical test plate in the shape of a segment of a spherical element and means for stressing the element to make its contour approximate the contour of an aspheric surface.

4 Claims, 3 Drawing Sheets

FRINGE PATTERN SHOWING LOCAL ERROR

FRINGE PATTERN SHOWING LOCAL ERROR

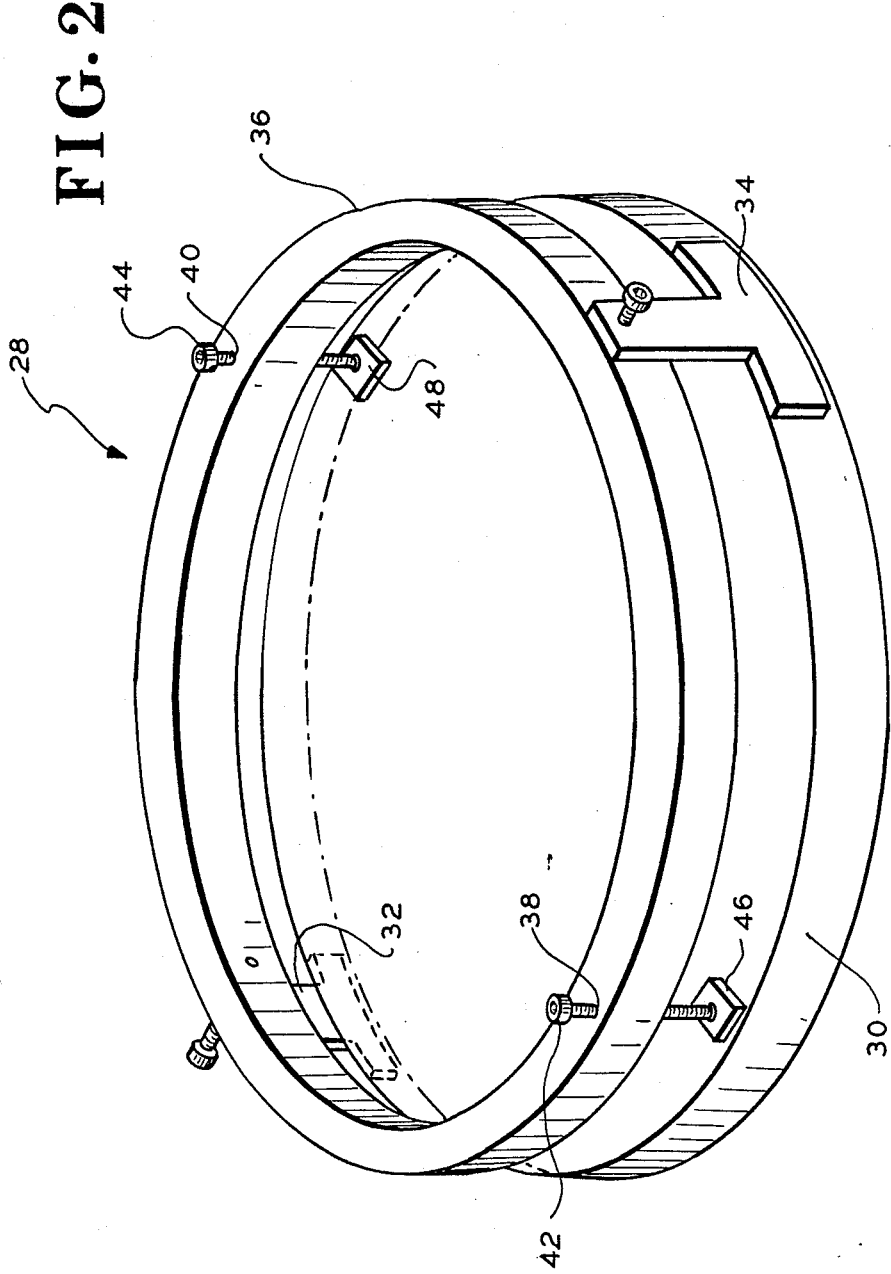

ASPHERIC OPTICAL TEST PLATE ASSEMBLY

The Government has rights in this invention pursuant to contract No. F30602-84-C-0087 awarded by the Department of the Air Force.

BACKGROUND OF THE INVENTION

This invention relates to optical components in general, and more particularly to an optical component for testing the qualitative surface contour of aspheric optical components.

Large reflecting optical components having reflecting surfaces are becoming increasingly important for use in large-aperture optical systems. For example, telescopes are now being designed which will utilize multiple reflecting surfaces whose output may be combined to increase the resolving power of the optical system. Such systems may incorporate therein aspheric optical surfaces, that is, surfaces whose geometry is not a segment of a sphere. Further complicating the manufacture of large aspheric optical components is the trend to manufacture such components from a number of elements which may be assembled to form a single, optical surface.

Large reflecting optical components are now manufactured by grinding a mirror blank into the desired shape using progressively finer abrasive materials, followed by refining the shape using polishing methods involving extremely fine abrasives. Obviously, it is most effective to grind away as large a quantity of material as possible before commencing polishing operations using the extremely fine abrasive. However, since a polishing error (e.g. the removal of an excessive amount of material) cannot be corrected, such polishing operations must be interspersed with frequent measurements of the surface contour of the optical element to measure its variation from its designed shape.

It is now feasible to quickly provide multiple measurements of the surface of an optical element undergoing fabrication by utilizing an optical interferometer suspended over the optical element to be measured. The interferometer makes use of a laser signal to measure the distance between the optical surface undergoing measurement and a fixed point. See, for example U.S. Pat. No. 4,457,625 which issued on July 3, 1984 which is owned by the assignee of this invention and the teachings of which are incorporated herein by reference. However, even though laser interferometric measurement techiques are capable of providing very accurate surface measurements, it may be difficult due to severe local errors in the glass surface to set up a laser interferometer to accurately measure all points on a large optical element undergoing fabrication, since laser rays reflecting from a severly sloped area may not return within the interferometer capture range. This is particularly critical where the optical surface is made from a number of elements which are intended to be butted together to form a large optical component with a continuous surface. It is characteristic that areas of steep error are located at the edge of any element. It is critical to have the surfaces near the joints of such adjoining elements smooth to ensure an overall aspheric surface with no aberrations.

In the case of an optical element having a surface shaped as a segment of a sphere, it is possible to manufacture a test plate as a segment of a spherical surface whose radius of curvature is identical to that of the optical element undergoing manufacture. The surface shape of the optical element being manufactured may be compared to the known shape of the test plate by placing the test plate on the element being manufactured in the location to be measured and generating an interferogram in a manner known in the art, as a Fizeau interferogram, for example as described in Jenkins and White's Fundamentals of Optics, page 265 and 266. The interferogram gives an indication of those locations on the element undergoing manufacture that require further grinding to make them conform to the surface shape of the test plate. By repeating the test as the surface of the element is successively polished, the precise shape of the surface of the optical element under manufacture may be controlled. While the foregoing test procedure is available for optical elements whose shape is a segment of a spherical surface, such a procedure has not been heretofore available to test optical elements having aspherical surfaces, due to the inability to economically manufacture a segment of an aspherical surface whose contour was equivalent to the aspherical contour of the optical element being manufactured.

SUMMARY OF THE INVENTION

Accordingly, a primary object of the present invention is to provide an aspheric optical test plate assembly which may be used to test the surface of an aspheric optical element as it is manufactured.

A second object is to produce an aspheric optical test plate assembly which may be easily manufactured from a segment of a spherical surface.

Still another object is to produce an aspheric optical test plate assembly whose contour may be easily and quickly changed to replicate the known contour of an aspheric optical element.

Another object is to produce an aspheric optical test plate assembly which may be used to compare the contour of a known aspheric surface to an adjacent area on the surface of an optical element as the element is being manufactured.

In accordance with the teachings contained herein, the present invention provides an aspheric optical test plate assembly whose surface contour may be altered by selectively deforming an optical test plate having a surface shaped as a segment of a sphere. the spherical test plate, whose manufacture and use for testing of other optical surfaces are known to those skilled in the art of large optical element fabrication, is retained in a stressing fixture which permits stresses to be selectively applied to the optical test plate. The fixture includes a circular reaction ring which is approximately equivalent in diameter to the diameter of the test plate. Two brackets are each bonded on one end to the edge of the test plate and are spaced 180° apart from each other. The other end of each bracket is fastened to the reaction ring. The reaction ring also includes two threaded apertures, each of which is spaced 90° apart from the point of attachment of each bracket to the reaction ring. Each threaded aperture receives a threaded screw which passes through the reaction ring and contacts a bearing pad bonded to the optical test plate.

The shape of the spherical optical test plate restrained in the fixture may be bent into an aspherical shape by applying pressure to the test plate using the two screws. An equal and opposite force pair is generated within the test plate by the two brackets which resist the force of the screws against the test plate. The two pairs of equal and opposite forces induced into the test plate cause the plate to assume an astigmatic shape, the extent of which can be varied to closely approximate the surface contour of an aspheric surface.

the optical test plate disclosed herein may be used to test areas of an aspheric optical element in the following manner. A section of the optical element having a known surface contour conforming to the desired design for the surface is first selected. This known surface contour must be equivalent to the desired contour of the surface area to be tested. The optical test plate assembly is placed on the optical element to be tested and is positioned over the area with the known contour. A light source is then positioned over the optical test plate and the screws tightened against the optical test plate to produce an interferogram having a parallel set of interference fringes. The parallel fringes are indicative that the test plate has been stressed so that its surface contour matches the contour of the optical element having a known surface shape. The optical test plate may then be moved to another location on the optical element being manufactured whose desired surface contour is equivalent to the contour of the area over which the test plate was first positioned. An interferogram is then generated to provide a qualitative comparison between the surface contour of the optical element at the first location and the contour of the surface at the location being tested, thereby providing a qualitative indication of the match between the contour of the surface of the element being manufactured and that of an area having a known contour.

BRIEF DESCRIPTION OF THE DRAWINGS

The foregoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several drawings and in which:

FIG. 2 is a perspective view of an aspheric optical test plate assembly constructed in accordance with the teachings of the invention.

DETAILED DESCRIPTION OF A PREFERRED EMBODIMENT

Figure 1:
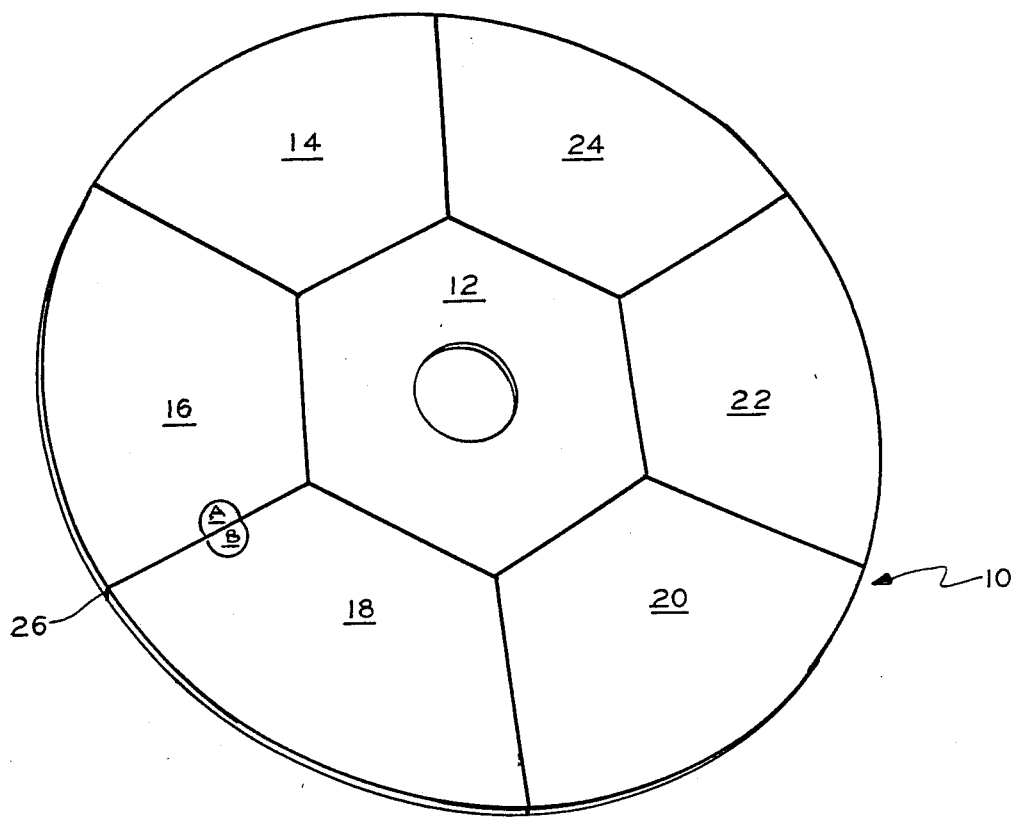
FIG. 1 is a perspective drawing of a segmented optical component.

Referring to the drawings, FIG. 1 shows a segmented optical mirror 10 having a central element 12 and peripheral elements 14, 16, 18, 20, 22 and 24. For mirrors having large optical apertures, e.g. apertures greater than two meters, it is convenient to manufacture the mirror in segments such as those shown in FIG. 1, and then butt the segments together. For example, mirror elements 16 and 18 may be manufactured individually and then joined along their common border, joint 26.

Optical components such as the mirror elements 16 and 18 may be manufactured in various ways which are well known to those skilled in the art of optical element fabrication. For example, the mirror elements 16 and 18 may be cast in shapes approximately equivalent to the final designed shape and the surfaces may then be ground to the final shape using any of a variety of well-known grinding techniques to product the desired surface shape and finish required for operation of the mirror in its designed configuration.

Optical element designers are now utilizing aspheric designs for reflective optical components. In the case of segmented mirrors, such designs require the fabrication and assembly of individual elements of an aspheric surface to produce a complete mirror. For example, it is possible to design the mirror 10 as an aspheric surface, in which event each of the elements 12, 14, 16, 18, 20, 22 and 24 would be segments of an aspheric surface. During the manufacture of each such element it is critical that the design specifications for the complete mirror be adhered to, to insure that each of the elements does not introduce any distortion or aberration into the reflected image. It is particularly important that each mirror segment be manufactured with a surface finish appropriate to provide a smooth transition between adjacent elements, i.e. elements 16 and 18 must have a smooth surface along the joint 26. When an optical component such as the mirror 10 is manufactured in one piece, providing a smooth surface finish is relatively easy since the entire surface may be ground and polished in successive stages, with frequent tests performed on the entire surface of the mirror. In the case of a segmented optical component, testing and further grinding of the entire surface may not be practical. It is, therefore, important that the surface finish of each element be accurately completed prior to assembly of the individual elements.

During the grinding or polishing of the surface of an element for a segmented optical component it is advantageous to compare the surface measurements with the measurements dictated by the element's design. Such measurements are often performed using a laser interferometer. For example, the laser interferometer described and claimed in U.S. Pat. No. 4,457,625 may be used to make such measurements. The use of such an interferometer requires stopping the polishing operation on the optical element to be tested and possible moving the element to be tested to a special test bed over which the interferometer is suspended. The foregoing procedure is time consuming and is disruptive of the polishing process. Furthermore, in cases where the surface irregularities are so rough, for example, where the peak-to-valley variation is greater than 5 $\mu$m per inch, measurements made using the laser interferometer will yield an unacceptable error due to the light reflected off the aberrated surface not returning within the capture range of the interferometer.

FIG. 2 shows a preferred embodiment of an aspheric optical test plate assembly 28 which may be used to compare the surface of a portion of an aspheric optical element having a known shape and surface uniformity to areas of the same or other optical elements which have been designed to have the same or a closely similar shape and surface uniformity to the known area. For example, FIG. 1 shows an area "A" on the aspheric optical element 16 which has been ground, polished and tested to a desired finish. During the manufacture of aspheric optical element 18, the surface characteristics of area "A" on element 16 should be replicated in area "B" on adjoining optical element 18.

The aspheric optical test plate assembly 28 includes an optical test plate 30 which is a segment of a spherical surface and which is made from a transparent material such as fused silica. The area of the aspheric surface under the test plate will have two local radiusses, one aligned to the mirror vertex and a different one at 90 degrees to that. The spherical test plate should be made to match the average of these two aspheric radiusses. A pair of brackets 32 and 34 are fastened to the optical test plate 30 for example, by the use of an RTV bond on the edge of the optical test plate 30. The brackets 32 and 34 are spaced 180° apart from each on the optical test plate 30. The ends of the brackets 32 and 34 fastened to the optical test plate 30 are rigidly fastened to a reaction ring 36. Preferably the reaction ring 36 has a pair of threaded apertures 38 and 40 passing therethrough, each of which is spaced 90° apart from each of the brackets 32 and 34. Each aperture 38, 40 receives an adjustable member, for example the screws 42 and 44, which pass through the reaction ring 36 and which contact the top face of the optical test plate 30. The members 42 and 44 may each rest against a plate 46, 48 which transmits pressure from the members 42, 44 into the test plate 30. The spherical surface of the optical test plate 30 may be easily deformed to match an off-axis section of an aspheric shape by applying pressure to the optical test plate 30 by tightening the screws 42 and 44.

Figure 3A:
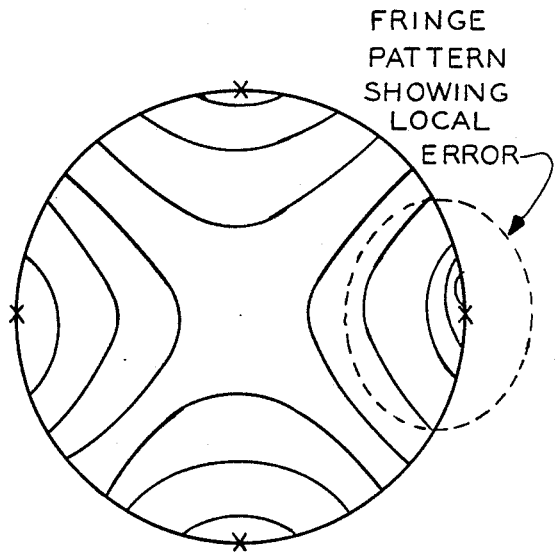
FIG. 3a shows a test fringe pattern with a local error on the surface of element 18.
Figure 3B:
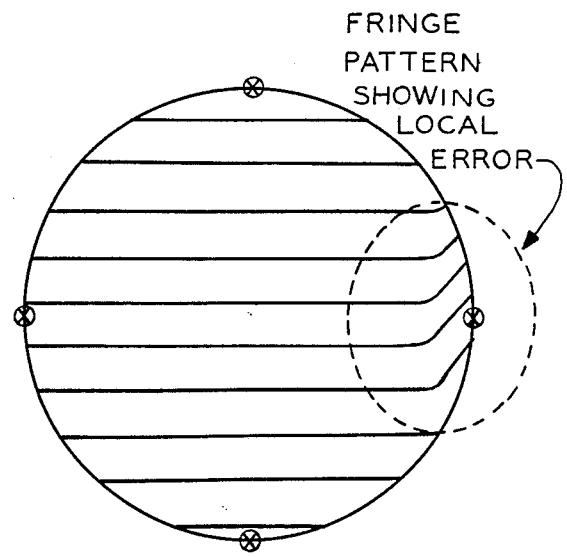
FIG. 3b shows the test fringe pattern for the local area depicted in FIG. 3a after the test plate has been stressed.

The aspheric optical test assembly 28 may be used to compare the contour of a known surface, for example location "A" of the optical element 16 with the contour of a surface designed to have the same contour, for example adjoining location "B" on optical element 18. The aspheric optical test plate assembly is positioned over location "A" on element 16 and an interferogram is produced by the interference of the light passing through optical test plate 30 and interfering with the light reflected from the surface of area "A" on element 16. The screws 42 and 44 are adjusted to produce an interferogram having essentially parallel lines. Under the foregoing conditions, the optical test plate 30 has been stressed so that it assumes a shape approximately equivalent to the aspheric shape of the optical segment 16 in the vicinity of location "A". The test plate element 28 may then be moved to location "B" on optical element 18 and an interferogram produced at the second location. A pattern of parallel test fringes is an indication that the surface contour at location "B" is equivalent to the surface contour at location "A". A non-parallel fringe pattern, for example the pattern shown in FIG. 3b, will provide an indication of the location and qualitative difference between the contour of the surface at location "A" and that at location "B". The surface of optical element 18 at location "B" may thereafter be reworked and retested to correct the discovered surface irregularity.

While a preferred embodiment has been described in detail herein, it should be apparent that the teachings and disclosure of the present invention will suggest many other embodiments and variations to those skilled in this art. For instance, although the present invention has been described in context with the measurement of an optical surface, the teachings herein are equally applicable to the measurement of the contour of any appropriate surface, such as the measurement of the surfaces of various models.

I claim:

1. An aspheric optical test plate assembly for comparing the contour of an aspheric optical surface at a first location with the known contour of an aspheric optical surface at another location, said aspheric optical test plate assembly including:

A. An optical test plate having the shape of a segment of a sphere, said optical test plate including a top surface, a bottom surface and an edge between said top surface and said bottom surface;

B. A pair of adjustable members for selectively applying pressure to the top surface of said optical test plate at locations near the edge of said optical test plate; and C. A fixture for retaining said optical test plate, said fixture including a reaction ring positioned above said optical test plate, said reaction ring having a diameter substantially equivalent to the diameter of said optical test plate, a pair of brackets for supporting said reaction ring above said optical test plate, each of said brackets having a first end fastened to said reaction ring and a second end fastened to the edge of said optical test plate, said brackets being spaced 180° apart from each other on said reaction ring and on the edge of said optical test plate, said reaction ring further including means for receiving a pair of adjustable members to permit said adjustable members to be adjusted to selectively apply pressure to said optical test plate, each of said adjustable members being spaced substantially 90° apart from one of said brackets on said reaction ring;

Whereby the comparison between the contour of an aspheric optical surface at said first location with the known contour of the optical surface at another location may be made by first placing the optical test plate assembly on the aspheric optical surface at said another location and adjusting the shape of said optical test plate to the shape of said aspheric optical surface at said another location by adjusting said adjustable members to selectively deform the bottom surface of said optical test plate and thereafter moving said aspheric optical test plate assembly to said first location and using a light source to produce an interference pattern at said first location to compare the contour of the aspheric optical surface at the first location with the shape of the bottom surface of said optical test plate.

2. The aspheric optical test plate assembly set forth in claim 1 wherein each of said adjustable members are threaded screws and wherein said means in said reaction ring for receiving said pair of adjustable members are a pair of threaded apertures.

3. The aspheric optical test plate assembly set forth in claim 1 wherein said brackets are retained to said optical test plate with room temperature vulcanizing (RTV) rubber.

4. The aspheric optical test plate assembly of claim 1 further including a plate between each of said adjustable members and the top surface of said optical test plate, whereby pressure may be applied by each of said adjustable members to said optical test plate through each of said plates.

* * * * *